United States Patent
Ellis et al.

(10) Patent No.: US 9,558,772 B1
(45) Date of Patent: Jan. 31, 2017

(54) POSITION ERROR SIGNAL (PES) DETECTION

(71) Applicant: Seagate Technology LLC, Cupertino, CA (US)

(72) Inventors: Timothy Ellis, Tonka Bay, MN (US); Thomas Zirps, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/245,902

(22) Filed: Apr. 4, 2014

(51) Int. Cl.
G11B 5/596 (2006.01)
G11B 5/55 (2006.01)
G11B 5/012 (2006.01)

(52) U.S. Cl.
CPC ........... G11B 5/5547 (2013.01); G11B 5/5521 (2013.01); *G11B 5/012* (2013.01)

(58) Field of Classification Search
CPC .................................................. G11B 5/55347
See application file for complete search history.

(56) References Cited

U.S. PATENT DOCUMENTS

| | | |
|---|---|---|
| 6,091,567 A | 7/2000 | Cooper |
| 6,188,539 B1 | 2/2001 | Elliot |
| 6,608,477 B2 | 8/2003 | Sacks |
| 7,064,914 B1 * | 6/2006 | Erden et al. .................... 360/31 |
| 7,457,066 B2 | 11/2008 | Ehrlich |
| 7,471,485 B2 | 12/2008 | Spaur |
| 7,859,778 B1 | 12/2010 | Vikramaditya |
| 7,990,646 B2 | 8/2011 | Rigney |
| 8,077,428 B1 * | 12/2011 | Chen et al. ..................... 360/75 |
| 8,107,182 B2 * | 1/2012 | Yen ................................. 360/67 |
| 8,189,286 B1 | 5/2012 | Chen |
| 8,254,063 B2 | 8/2012 | Zambri |
| 8,451,697 B1 | 5/2013 | Rigney |
| 8,531,798 B1 | 9/2013 | Xi |
| 8,570,679 B2 | 10/2013 | Wu |
| 2004/0001273 A1 * | 1/2004 | Takaishi .................... 360/77.08 |
| 2015/0103435 A1 * | 4/2015 | Kosugi et al. ............. 360/77.08 |

* cited by examiner

*Primary Examiner* — Andrew L Sniezek
(74) *Attorney, Agent, or Firm* — Cesari & Reed, LLP; Kirk A. Cesari; Logan Brown

(57) ABSTRACT

Methods and apparatuses for modulating a position error signal detection gate signal responsive to a track crossing velocity are discussed. The position error signal can be used to detect position information. A track crossing velocity can be estimated and then used via the modulating. Phase errors due to the track crossing velocity can be minimized.

20 Claims, 18 Drawing Sheets

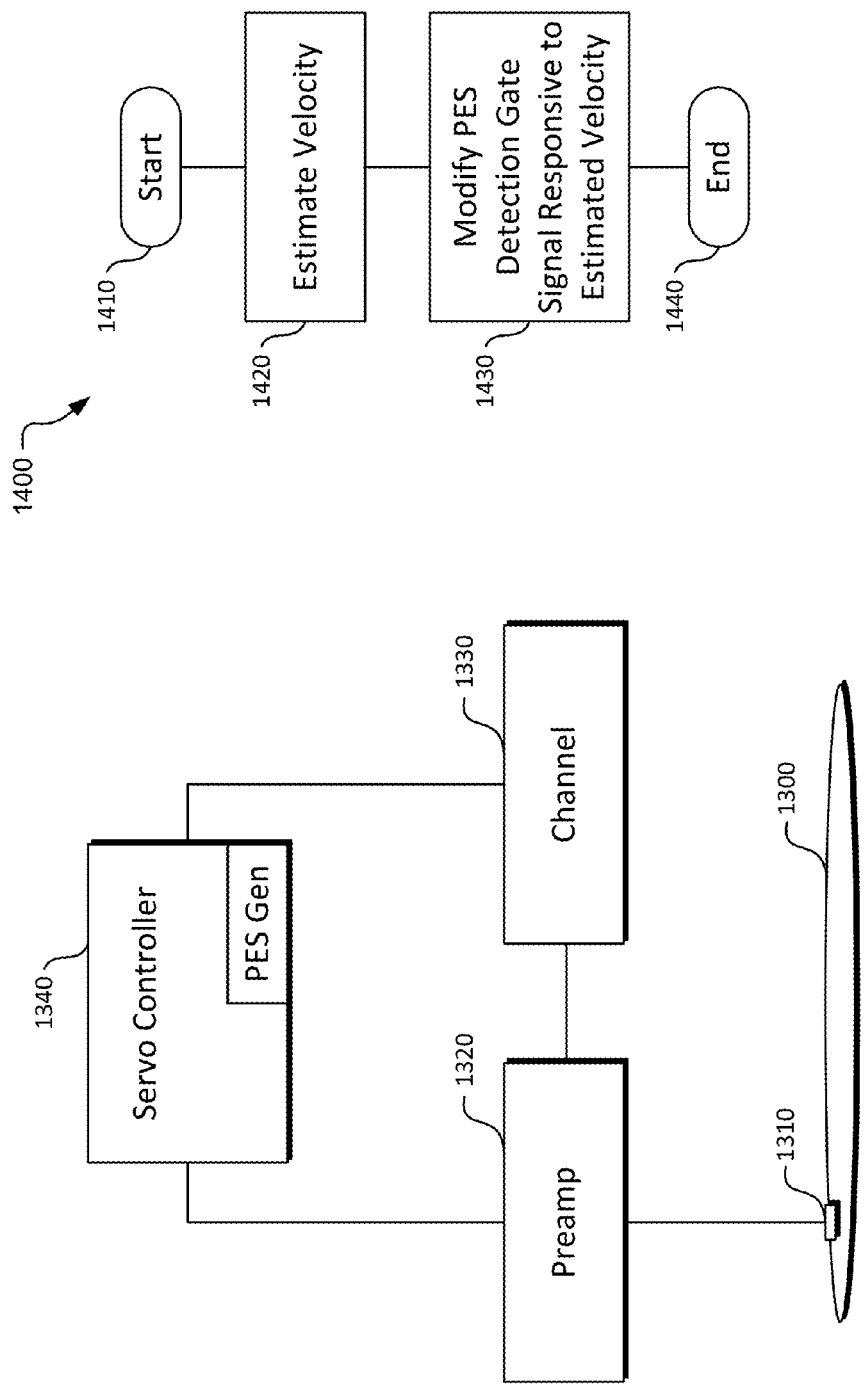

POSITION ERROR SIGNAL (PES) DETECTION

SUMMARY

Accurate position error signal (PES) detection at high velocities can be achieved, for example, through the modification of the PES detection gate signals. In certain embodiments, a controller can be adapted to modulate a position error signal detection gate signal responsive to a track crossing velocity.

In some embodiments, a method can include estimating a velocity at samples, and modifying a position error signal detection gate signal to compensate for a phase error related to the velocity.

In some embodiments, a circuit can be configured to estimate a seek velocity across tracks of a storage medium, and modulate at least one of a burst gate gap, width, delay and center-to-center value based on the seek velocity.

BRIEF DESCRIPTION OF THE DRAWINGS

FIG. 13 is a block diagram for implementing PES detection gate signal modification, in accordance with certain embodiments of the present disclosure.

FIG. 14 is a flowchart of a method for PES detection gate signal modification, in accordance with certain embodiments of the present disclosure.

DETAILED DESCRIPTION

The following description details improving position error signal ("PES") accuracy. This method allows an increase in accuracy at high track-crossing velocities that enables consistent seek performance. An alternative servo pattern is also explained. Servo PES detection at high speed is a factor for data integrity and performance.

Systems that move robotic arms from one position to another may need to do that as quickly as possible. An example of such a system is a mass storage device. In particular, disc drives can move a transducer with an actuator assembly from an initial position (a track) to a target position (track). That move is known as a seek, and is part of what is characterized as an access time. The access time also includes a settle time and a track latency. One aspect of achieving a fast access time is to move the transducer during a seek in such a manner that the transducer can then settle quickly on the target track.

The seek function can be improved by using accurate position information that is obtained as the transducer is moved from the initial track to the target track. The position information is included in other tracks between the initial and target tracks. Knowing accurate position information will allow the seek to be controlled so that the transducer can repeatedly settle quickly on the target track. However, one concern is the accuracy can be degraded by the velocity of the transducer as it moves over the tracks. This velocity may induce errors in the position information, which will reduce position information accuracy and then reduce the ability to repeatedly settle quickly.

Figure 1:
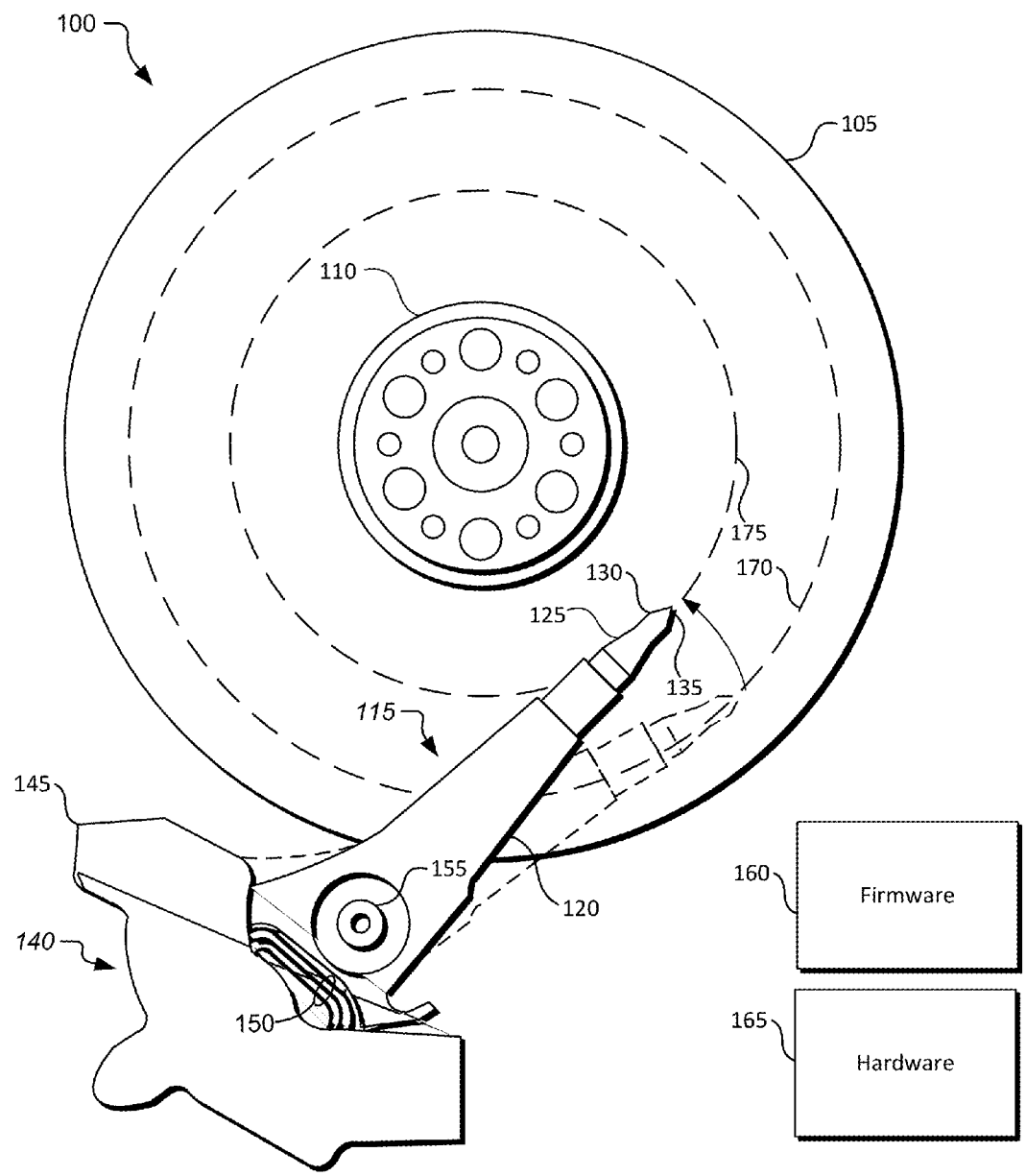
FIG. 1 illustrates a system that uses improved PES detection, in accordance with certain embodiments of the present disclosure.

More detail will be provided with reference to FIG. 1 that shows a system 100 that is embodied as a hard disc drive. System 100 includes a magnetic medium 105 that is mounted to a spindle motor (not shown) by disc clamp 110. System 100 also includes an actuator assembly 115 that includes an actuator arm 120 and a flexure 125. At an end 130 is a head gimbal assembly that includes the read/write transducer (not shown). A tab 135 is used to support actuator assembly 115 on a ramp (not shown). System 100 also includes a voice coil motor (VCM) 140 that includes magnets (not shown) under a housing 145. VCM 140 also includes coils 150 that are attached to actuator assembly 115. Current through coils 150 creates a magnetic field that interacts with the field of the VCM magnets to move actuator assembly 115 about pivot 155.

System 100 also includes firmware block 160 and hardware block 165 that interact to accurately determine the position of the system transducer. Firmware block 160 can also include other functions of system 100. For example, in a hard disc drive, firmware block can provide functions such as buffer management, servo and spindle motor control, error detection and correction, background tasks such as disc scanning, defect management and other functions used by a hard disc drive. Hardware block 160 is electronic circuits that execute the functions of firmware block 160. Hardware block 160 can also provide additional functions not part of firmware block 160.

Actuator assembly 115 can be positioned so that the transducer is track-following track 170. Actuator assembly 115 can then be commanded to access an address on track 175. In this case, actuator assembly 115 seeks to track 175. When the transducer is within a threshold distance of the target track 175, the actuator assembly settles on track 175 to then start track following. When the desired address on track 175 is within operational distance of the transducer, data saved at the address can be accessed (e.g., read or written).

Figure 2:
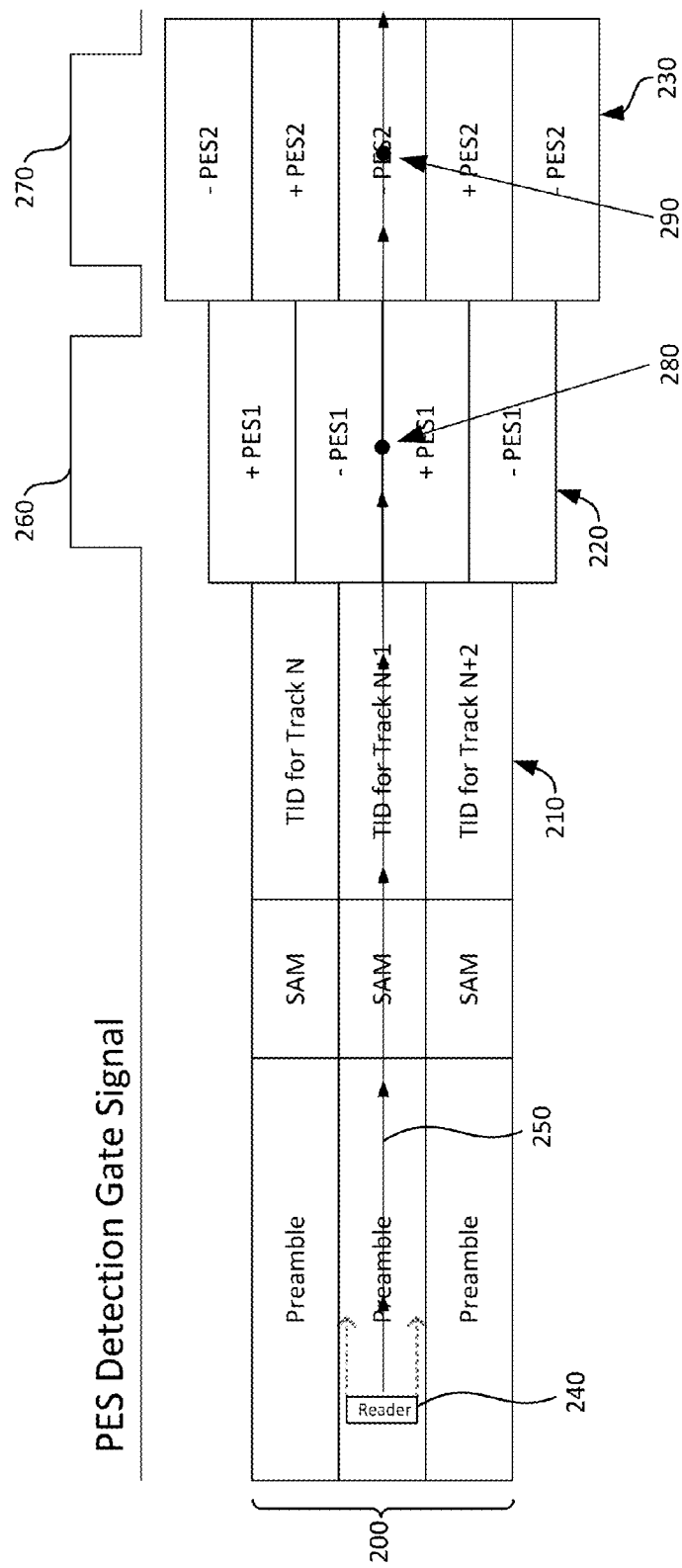
FIG. 2 illustrates a layout of a "Null" patterned servo sector, in accordance with certain embodiments of the present disclosure.

The position information discussed previously is contained in tracks of magnetic medium 105 (like 170, 175) to assist actuator assembly 115 in performing a seek. To illustrate, FIG. 2 shows three tracks 200 that each have associated exemplary position information, which includes track IDs (TIDs) 210 and position error signal fields (PES1, PES2) 220, 230. Along with a shown sector address mark (SAM), TID 210, PES1 220 and PES2 230 are part of servo information for respective tracks. A shown preamble can also be included as part of the servo information. Servo information is located circumferentially on a track. Thus, each track contains multiple TIDs and PES.

TIDs 210 are unique track identification numbers for each track, and are used for coarse position information. PES1 220 and PES2 230 are servo burst signals that are used for fine position information. FIG. 2 shows PES1 220 and PES2 230 in a null pattern. The PES fields are depicted as being written in a quadrature fashion with respect to the radius of the magnetic medium although this is not required. As the reader 240 of the transducer and the magnetic medium move relative to each other, reader 240 reads TIDs 210 and PES1 220 and PES2 230 to control the position of the transducer relative to the surface of the magnetic medium. For example, reader 240 reads TID for Track N+1, and then PES1 and PES2 to keep the transducer following track N+1 along centerline 250.

TIDs 210 and PES1 220 and PES2 230 are also used for track seeks. At a seek velocity above a threshold (e.g., around 20-30 inches/sec) TIDs 210 can be used by themselves to provide position information to position detection circuitry of the system. The position detection circuitry can be included in the servo function of the system. Position detection circuitry can include timing circuits and a preamplifier.

TIDs 210 may not be accurate enough to allow for repeatable settling characteristics. When the seek velocity is below the threshold, a more accurate position measurement can be obtained by using PES1 220 and PES2 230. Regardless, the fine position detection circuitry integrates the product of a servo clock (synchronized to the preamble) and position information from PES1 and PES2 to form the fine position value for each position field. These two values are then processed through linearization algorithms and yield a single fine position value. This value in conjunction with the track ID make up the PES at that point on the track.

However, reading PES1 220 and PES2 230 during a track seek may be error prone. Servo control theory as well as servo detection theory assumes that reading PES1 220 and PES2 230 is taken at a single radial location at each servo sector. Due to the length of the servo information, this assumption generally applies if there is no appreciable velocity of the transducer across the track while the various components of the position information are being measured. If there is appreciable track crossing velocity during this time, errors will result in the position measurement. Thus, repeatable settling characteristics will be difficult to obtain.

A more detailed explanation of the effect of track crossing velocity (including seek velocity) on position measurement follows. Reader 240 follows track N+1 along centerline 250. Position detection circuitry (either hardware 165 or a combination of hardware 165 and firmware 160 in FIG. 1) uses PES detection gate signals 260, 270 to time the detection of PES1 220 and PES2 230. The position centers 280, 290 are at about the center of PES detection gate signals 260, 270. A position center is the apparent position that will be detected by the position detection circuitry for each PES field.

When the system is track following, there is little to no velocity crossing the track throughout the position information. This is true even in virtual disc formats where the transducer intentionally does not follow the track defined by the circumferentially located position information. When track crossing velocity is small with respect to track pitch, each sample of position information can be assumed to be taken from a single radial position. Then the relationship between PES1 and PES2 is constant with respect to radius. Therefore, the final position sample value is accurately formed from the TID, PES1 and PES2.

Figure 3:
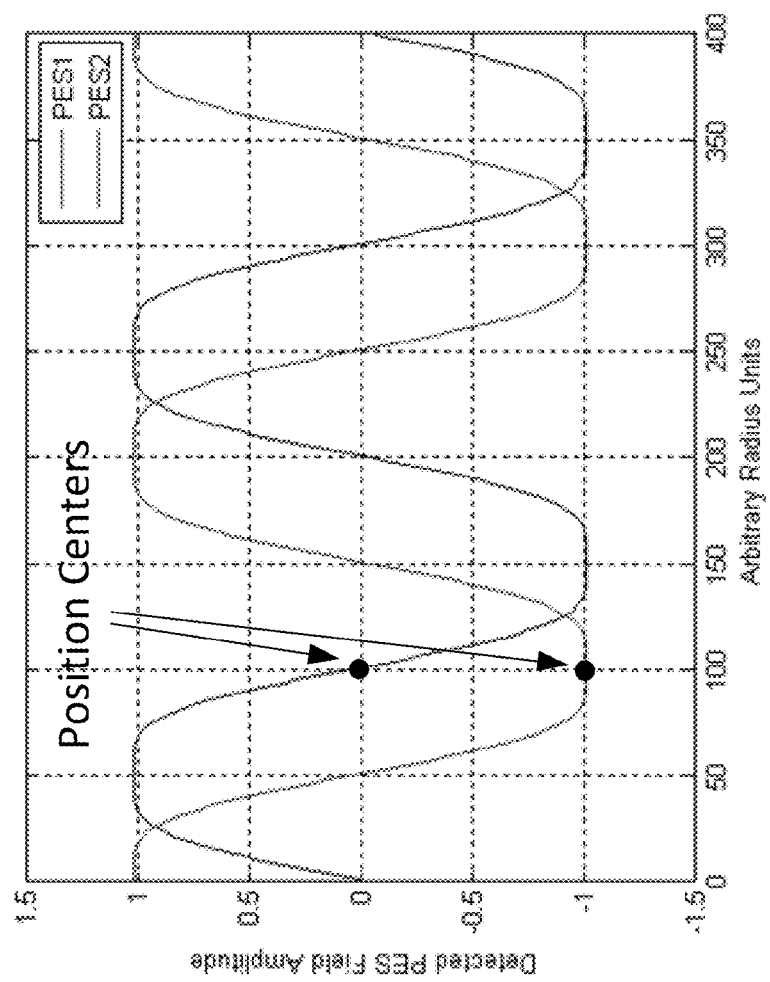
FIG. 3 shows a plot of both PES field amplitudes as a function of radius, in accordance with certain embodiments of the present disclosure.

FIG. 3 is a plot of PES1 and PES2 amplitudes as a function of radius of the position centers 280, 290 indicated in FIG. 2. Those position centers are located on a vertical line through the figure. This will always be the case if there is no change in position between the two fields, i.e., there is no appreciable transducer velocity traversing the track. This is the assumption for PES field amplitude relationship mentioned above.

Figure 4:
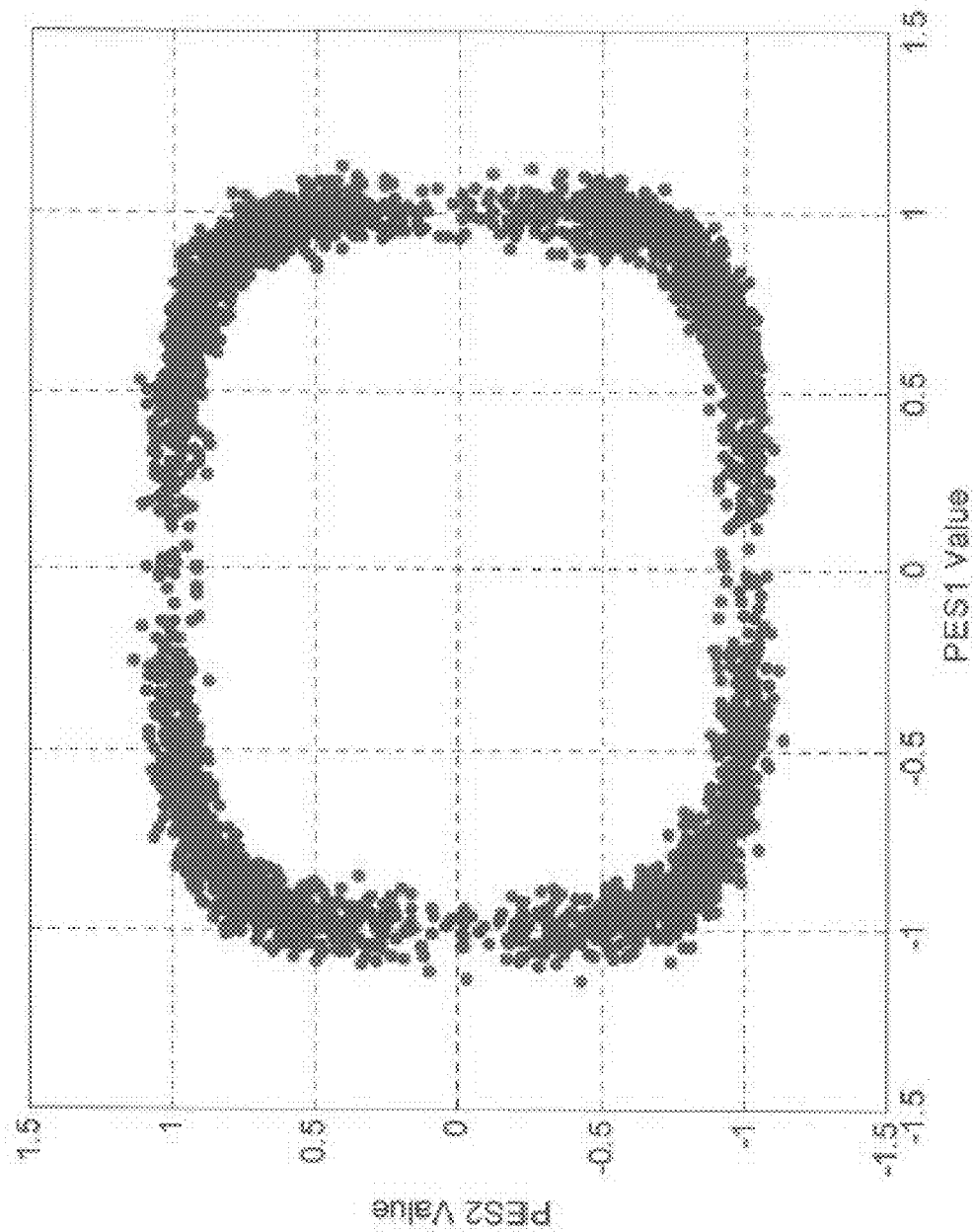
FIG. 4 shows a wreath plot of PES values when track following, in accordance with certain embodiments of the present disclosure.

Another way of visualizing this error is with a phase plane or "wreath" plot. This kind of plot, shown in FIG. 4, is derived by plotting PES 1 and PES2 values as ordered pairs. PES1 is the X-axis and PES2 is the Y-axis. As noted earlier and illustrated in FIG. 2, PES1 and PES2 are written in a spatially quadrature, i.e., $\pi/2$ radians, of phase shift with respect to each other. Note that the amount of phase shift ($\pi/2$ radians in this case) is relative to the position information pattern being used. As shown, there is no appreciable transducer velocity traversing the track. This may be the case when the transducer is track following.

Figure 5:
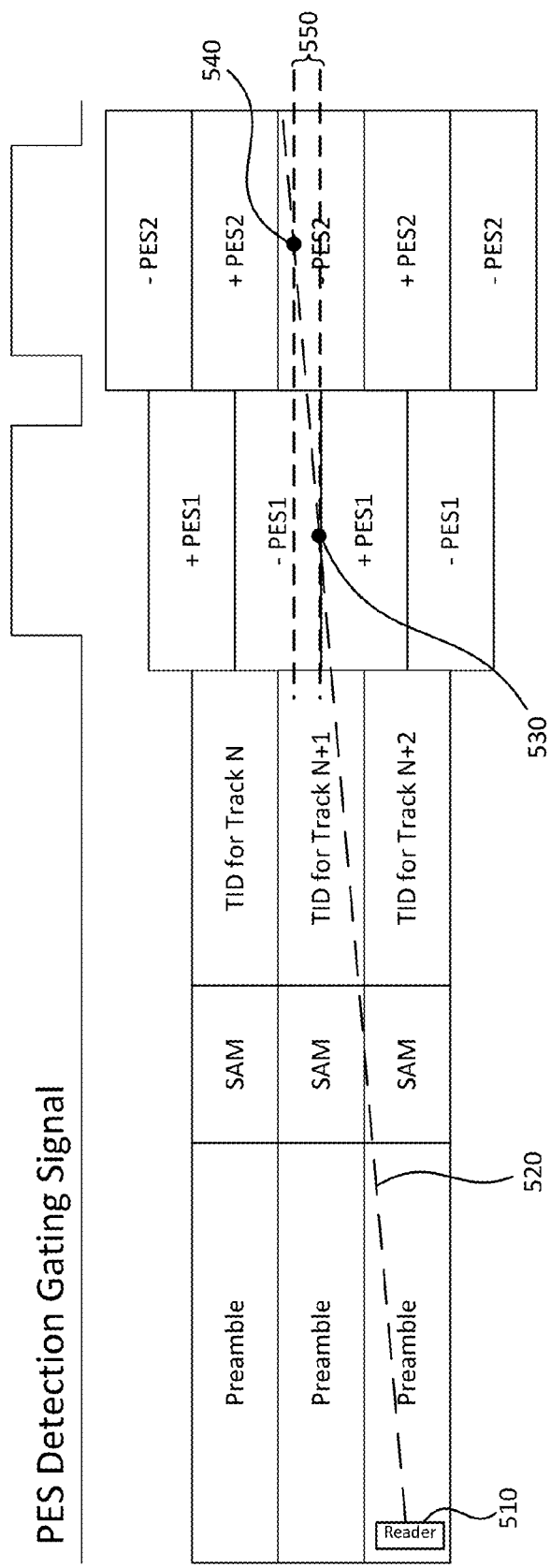
FIG. 5 illustrates a trajectory for a track-crossing velocity, in accordance with certain embodiments of the present disclosure.
Figure 6:
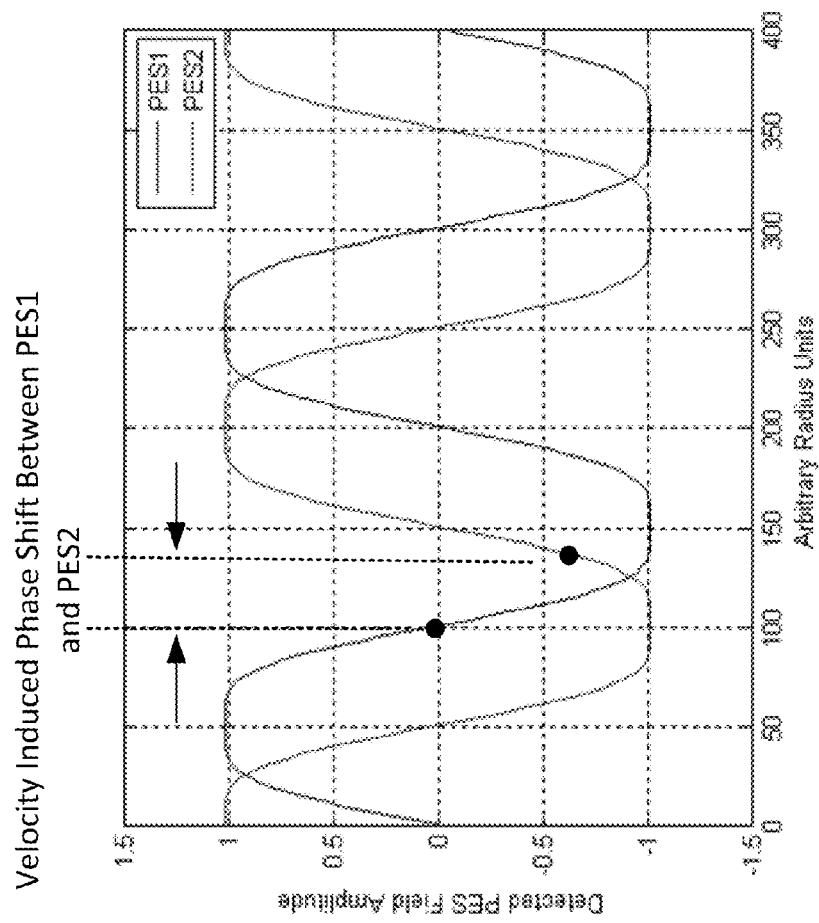
FIG. 6 shows a shift in the phase relationship between detected positions of two PES fields, in accordance with certain embodiments of the present disclosure.

When the servo system is seeking, the assumption that the position centers will be on the same horizontal line as shown in FIG. 3 may not hold true. The nature of the seeking PES field relationships may not be ignored because the error can be significant. FIG. 5 shows a trajectory 520 of a reader 510 for a track-crossing velocity of about 20 IPS (inches per second) at a track pitch of 300 KTPI with a 300 MHz position information pattern. Position centers 530, 540 are no longer located on a horizontal line because of the larger track-crossing velocity with respect to track pitch. An error 550 is on the order of ⅓ of a servo track. Mapping position centers 530, 540 as shown in FIG. 6 shows the apparent shift in the phase relationship between the detected position centers 530, 540 of the two PES fields.

Figure 7:
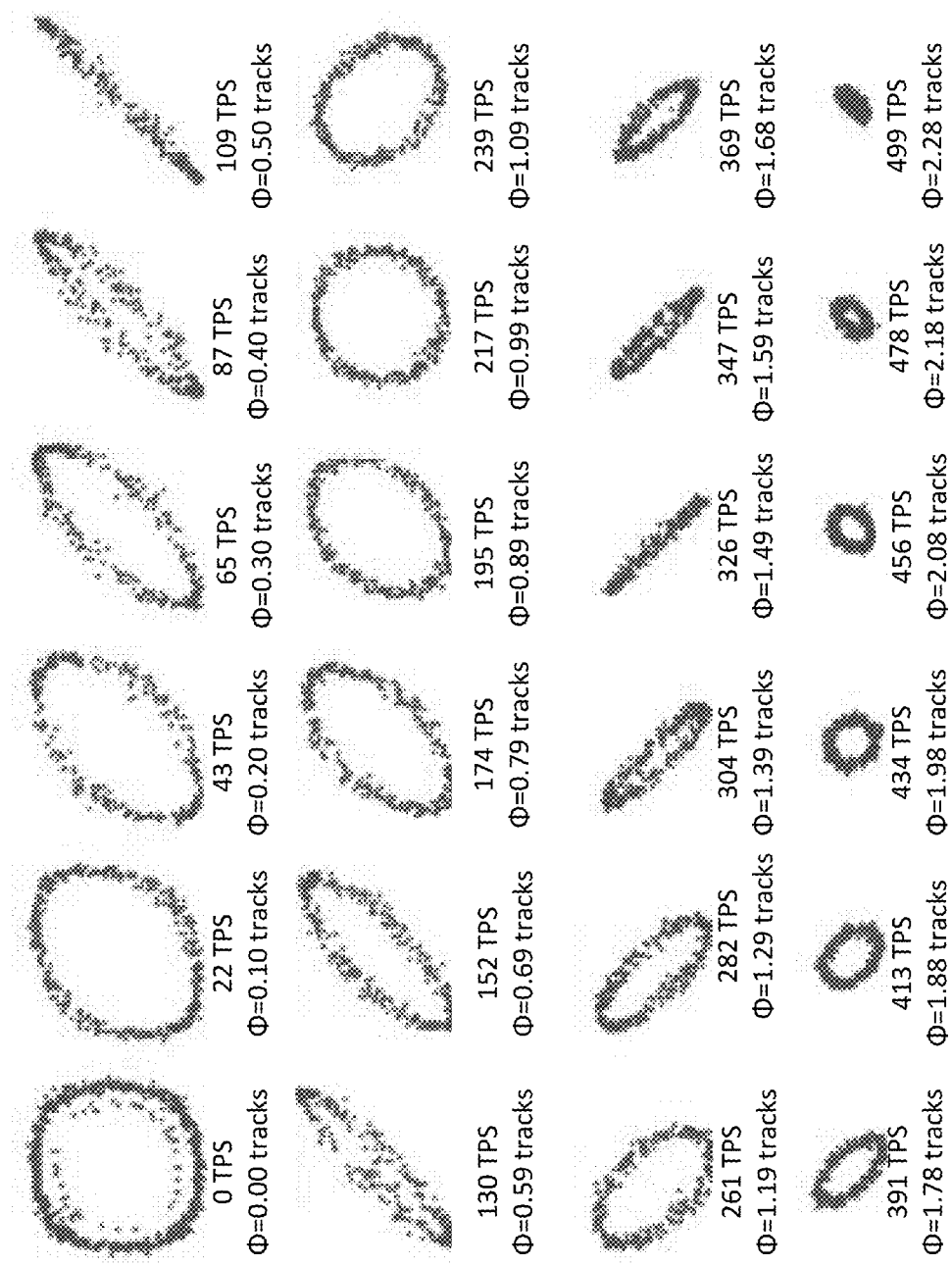
FIG. 7 shows wreath plots from an operating disc drive for various seek velocities and the errors induced, in accordance with certain embodiments of the present disclosure.

FIG. 7 shows the wreath plots from an operating disc drive for various seek velocities and the errors induced. At seek initialization when the track crossing velocity is increasing, the wreath plot will begin to distort and elongate, indicating the velocity-induced phase shift between PES signals. As the velocity, indicated in tracks per servo sector increases, the phase begins to shift dramatically. This can be seen by observing that the circle at zero tracks/sector (TPS) translates into a 45 degree line at ~109 TPS. This indicates that the phase of PES1 is the about the same as PES2, i.e. shifted by $\pi/2$ radians. At ~217 TPS, the circular pattern has returned but it is now of completely opposite phase, i.e. about $\pi$ radians, as indicated by the progression of plots up to this point. Continuing along this progression, note that at ~326 TPS the phase shift is about $3\pi/2$ radians as indicated by the −45 degree line. Finally, at ~434 TPS the phase shift is about $2\pi$ radians. These error levels are one-half track or more, which is significant in high performance servo systems. This error can cause a loss of throughput and disc drive performance. One way of dealing with this error is to reduce seek loop gains and make allowances in other system functions to deal with seek arrival issues. That is not desirable.

Figure 8:
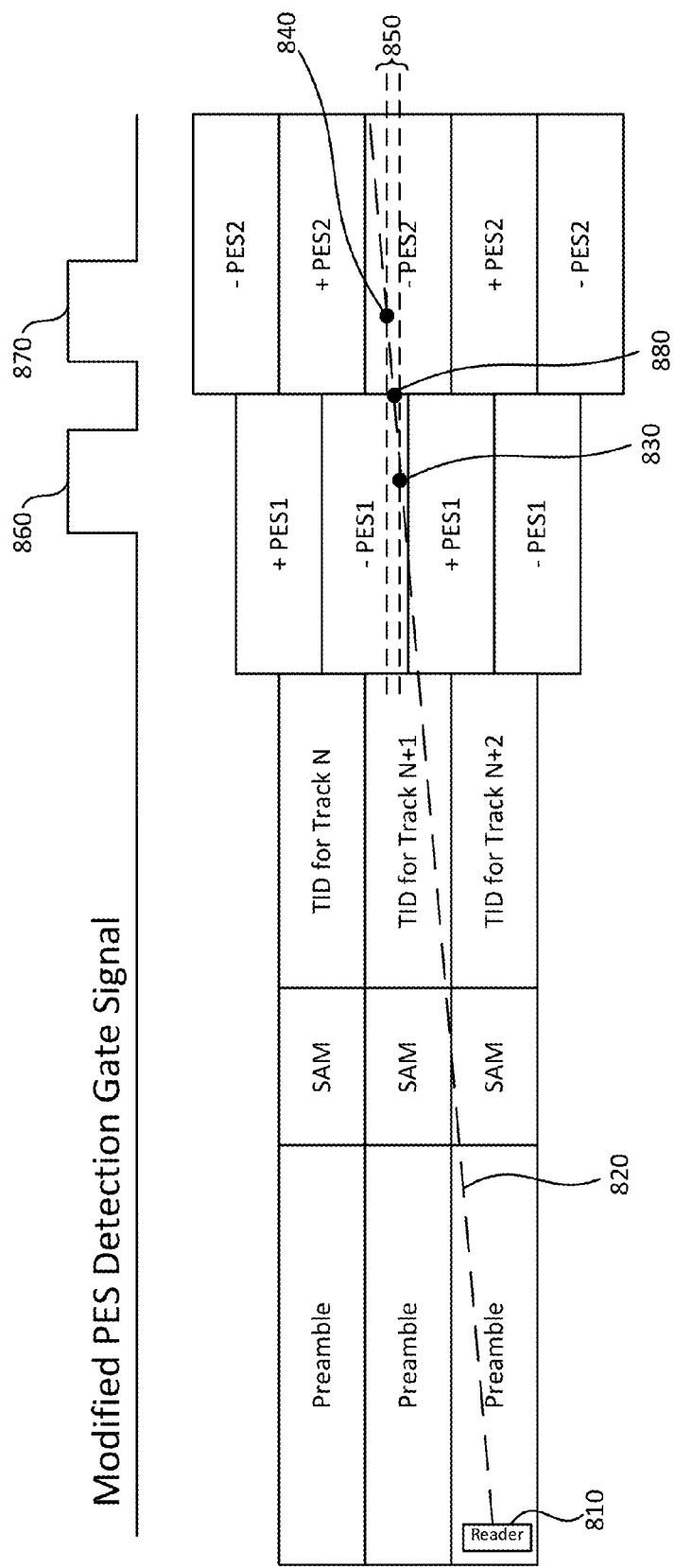
FIG. 8 illustrates a trajectory with modified burst gate signals, in accordance with certain embodiments of the present disclosure.

Modifying the PES detection gate signals can reduce the effect of that velocity-induced position error. For example, FIG. 8 shows modified PES detection gate signals 860, 870 that are used by the servo system demodulator to detect PES1 and PES2 at position centers 830, 840. As shown position centers 830, 840 are shown having closer timing to each other, thus reducing error 850 (<error 550 in FIG. 5). In one embodiment, making the PES detection gate signals shorter and moving them closer together minimizes the difference in position centers and the resulting velocity induced phase shift. Therefore, velocity-induced position error can be minimized.

Figure 9:
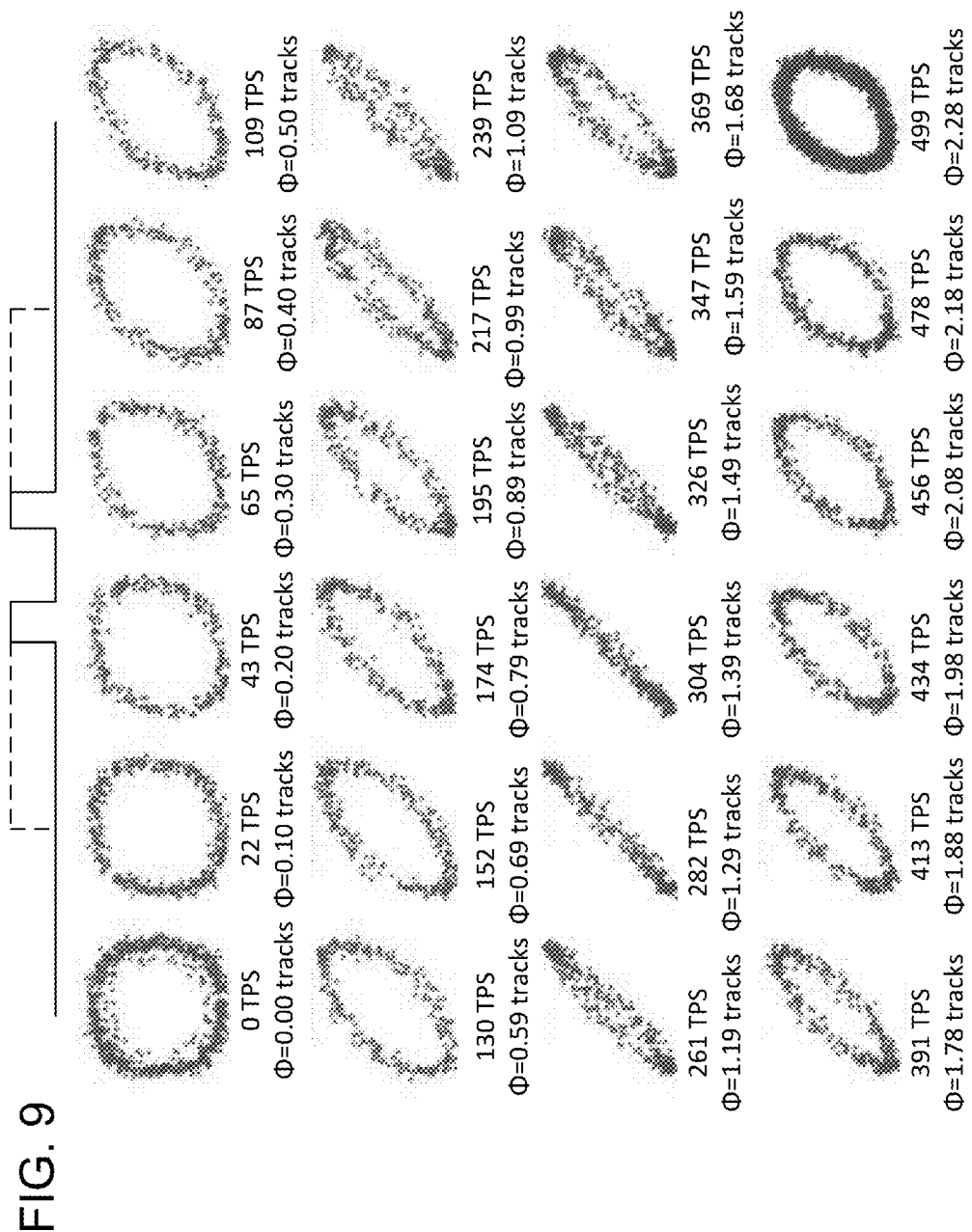
FIG. 9 shows a progression of wreath plots for burst gates that are reduced in size and shifted closer together when seeking, in accordance with certain embodiments of the present disclosure.

FIG. 9 shows the progression of wreath plots for PES detection gate signals that are reduced in size and shifted closer together when seeking. Notice that a seek velocity of 109 TPS now has a minor distortion corresponding to a phase error of only about $\pi/5$ radians which is well less than one quarter of a track. Also, recall previously the wreath plot reached the 45 degree line indicating that the phase has shifted by about $\pi/2$ radians at 109 TPS. Note that this point is not reached until 304 TPS.

One embodiment to modify the PES detection gate signals is for the system to estimate the seek velocity. Specifically, at every servo gate (the signal used to indicate to the system that the transducer is over the servo/position information) the system calculates an estimated velocity, which is the difference of the PES at the previous servo gate and the PES at the current servo gate (tracks crossed including the fractional portions also). Since the sample rate is constant, the difference is not explicitly divided by the sample time as this is a scale factor. If sample rate were variable, then the difference would be divided by the actual instantaneous sample period. In some embodiments the estimated velocity is used for other systems functions, and may already be available for use by the present system.

Figure 10A:
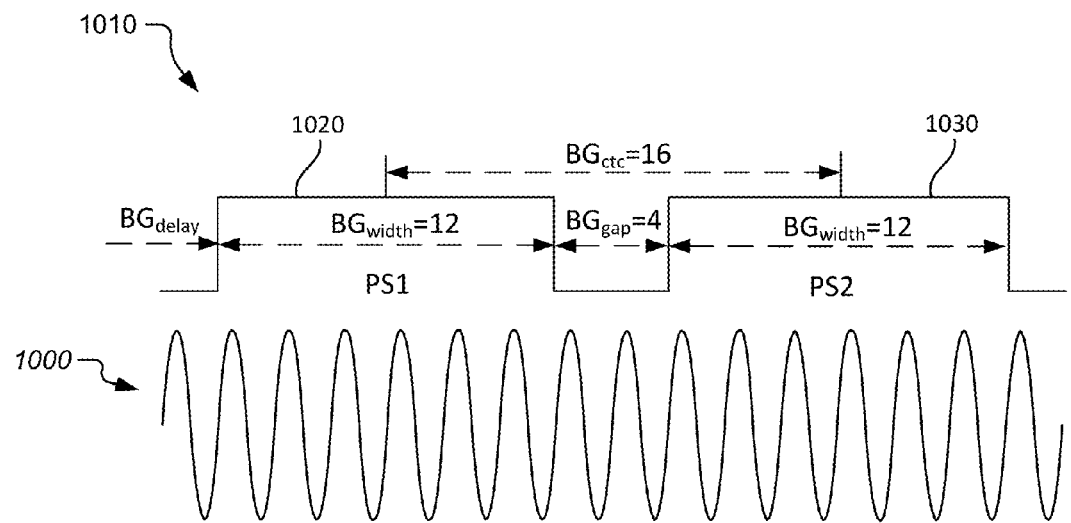
FIGS. 10A and 10C show timing for PES detection gate signals, in accordance with certain embodiments of the present disclosure.

The estimated velocity can then be used by position detection circuitry to compensate for the velocity effect. First, an implementation of determining how to adjust the PES detection gate signals will be explained. Shown in FIG. 10A is a timing diagram of PES detection gate signals (also referred to as burst gates(BG)). This timing can be implemented in a servo channel circuit, such as a servo channel IC provided by Marvell Semiconductor, Inc. or LSI Corporation. Shown is a clock signal 1000 that is used to time PES detection gate signals 1010. A unit of clock signal 1000 is a cycle, which corresponds to 180° of clock signal 1000. A half-rate cycle corresponds to 360° of clock signal 1000.

PES detection gate signals 1010 includes PS1 gate signal 1020 and PS2 gate signal 1030. PS1 gate signal 1020 and PS2 gate signal 1030 have respective widths $BG_{width}$, both shown as 12 cycles. The time between PS1 gate signal 1020 and PS2 gate signal 1030 is a gap $BG_{gap}$, shown as 4 cycles. A center-to-center time $BG_{ctc}$ of PS1 gate signal 1020 and PS2 gate signal 1030 is shown as 16 cycles. PES detection gate signals 1010 starts a predetermined delay $BG_{delay}$, which can be relative to another event such as the receipt of a SAM (shown in FIG. 1). Also, $BG_{delay}$, $BG_{gap}$, $BG_{width}$ or $BG_{ctc}$ can be determined based on the physical size of the position information on the track.

A method to determine how to optimally adjust the PES detection gate signals 1010 starts with using the timing of PES detection gate signals 1010 as shown, for example, and determining the PES misalignment across a range of velocities. This is preferably repeated for every possible $BG_{ctc}$ with an even number of cycles, for example as shown in FIG. 10A where $BG_{gap} \geq 4$ and $BG_{width}(PS1)+BG_{gap} BG_{width}(PS2) \leq 28$. $BG_{gap}$ is selected along with the $BG_{width}$ to achieve the correct burst gate center location for the current velocity. The minimum $BG_{gap}$ is preferably related to the size of the write splice between the two individual PS fields.

In more detail, the modulation of $BG_{ctc}$ is a function of $BG_{width}$ and $BG_{gap}$, such as $BG_{ctc}=BG_{width}+BG_{gap}$. Since there are often multiple possible $BG_{width}$, $BG_{gap}$ pairs that can be used to achieve the same $BG_{ctc}$, other considerations can be used to choose a better or best pair. One consideration uses a large $BG_{width}$ to allow more cycles of the position servo burst to be sampled and, therefore, results in cleaner and more repeatable position servo amplitude measurements. Another consideration uses a small $BG_{width}$ (when seeking) to reduce the radial distance traversed by the head during position servo sampling. This results in less "smearing" of the position servo signal. Given that each radial position offset across a two track range has a unique position servo amplitude, "smearing" occurs when the demodulator collects and averages position servo samples from multiple radial positions in the same Burst Gate. As an extreme example, if the velocity was such that the head traveled exactly two tracks in the selected $BG_{width}$ time, the position servo amplitude would always (ignoring noise) be zero regardless of the head's position.

For the lowest scheduled velocity range, preferably the largest possible $BG_{width}$ is used to provide clean position servo signals during the seek settle. For all other velocity ranges, preferably the minimum $BG_{width}$ (1 burst cycle) is used to reduce smearing. Once $BG_{ctc}$ and $BG_{width}$ have been chosen, $BG_{gap}$ is a function of $BG_{ctc}$ and $BG_{width}$, such as $BG_{gap}=BG_{ctc}-BG_{width}$. Also, since $BG_{width}$ and $BG_{gap}$ are chosen through the process above, $BG_{delay}$ is adjusted to make sure that the center of $BG_{gap}$ never moves. Its location is determined by BGdelay+BGwidth+BGgap/2.

Figure 10B:
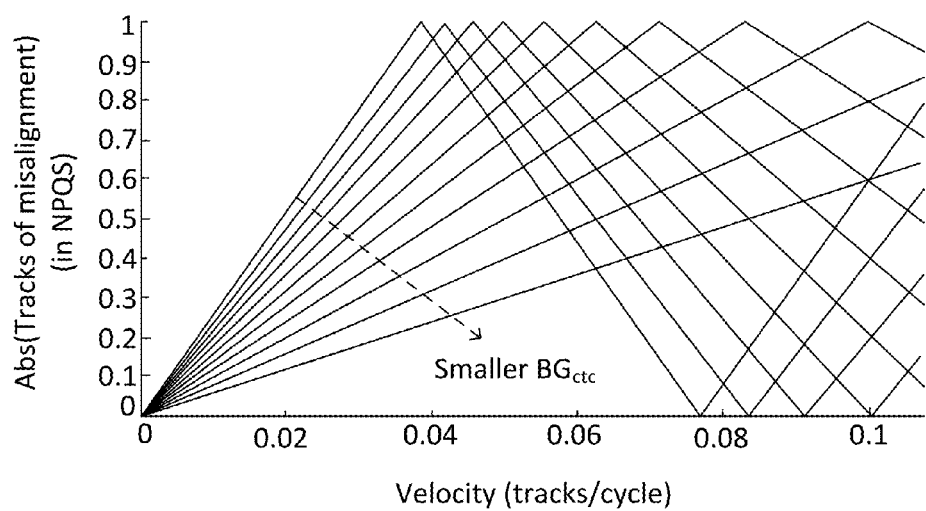
FIGS. 10B and 10D show a plot of misalignment versus velocity, in accordance with certain embodiments of the present disclosure.
Figure 10C:
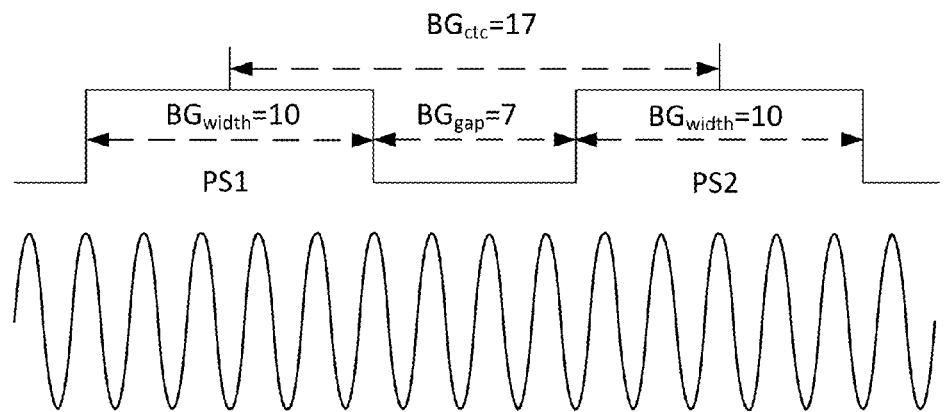

The results of this method are shown in FIG. 10B. Next, the method is repeated using an $BG_{ctc}$ with an odd number of cycle values. This is shown in FIG. 10C with the results shown in FIG. 10D. The $BG_{ctc}$ values shown in FIG. 10B are 6, 8, 10, 12, 14, 16, 18, 20, 22, 24 and 26. The $BG_{ctc}$ values shown in FIG. 10D are 9, 11, 13, 15, 17, 19, 21, 23 and 25.

Figure 10D:
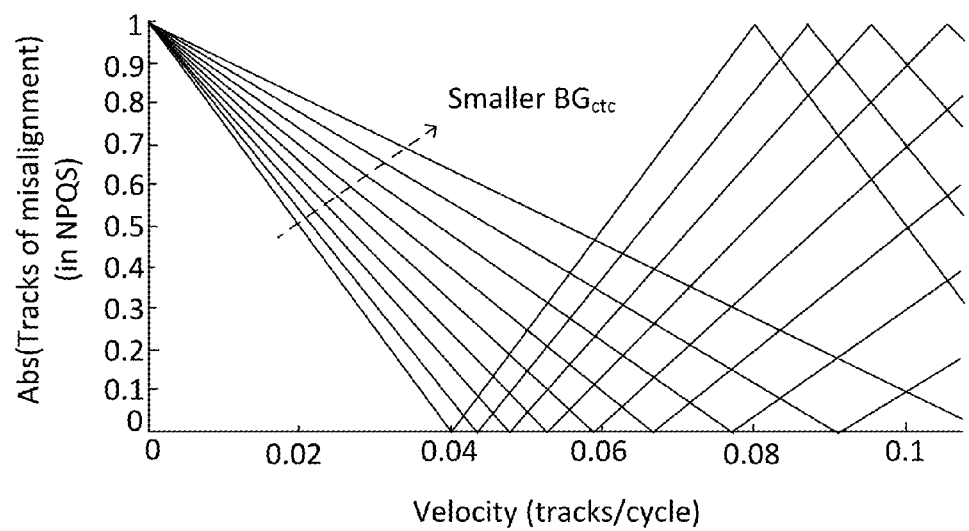
Figure 10E:
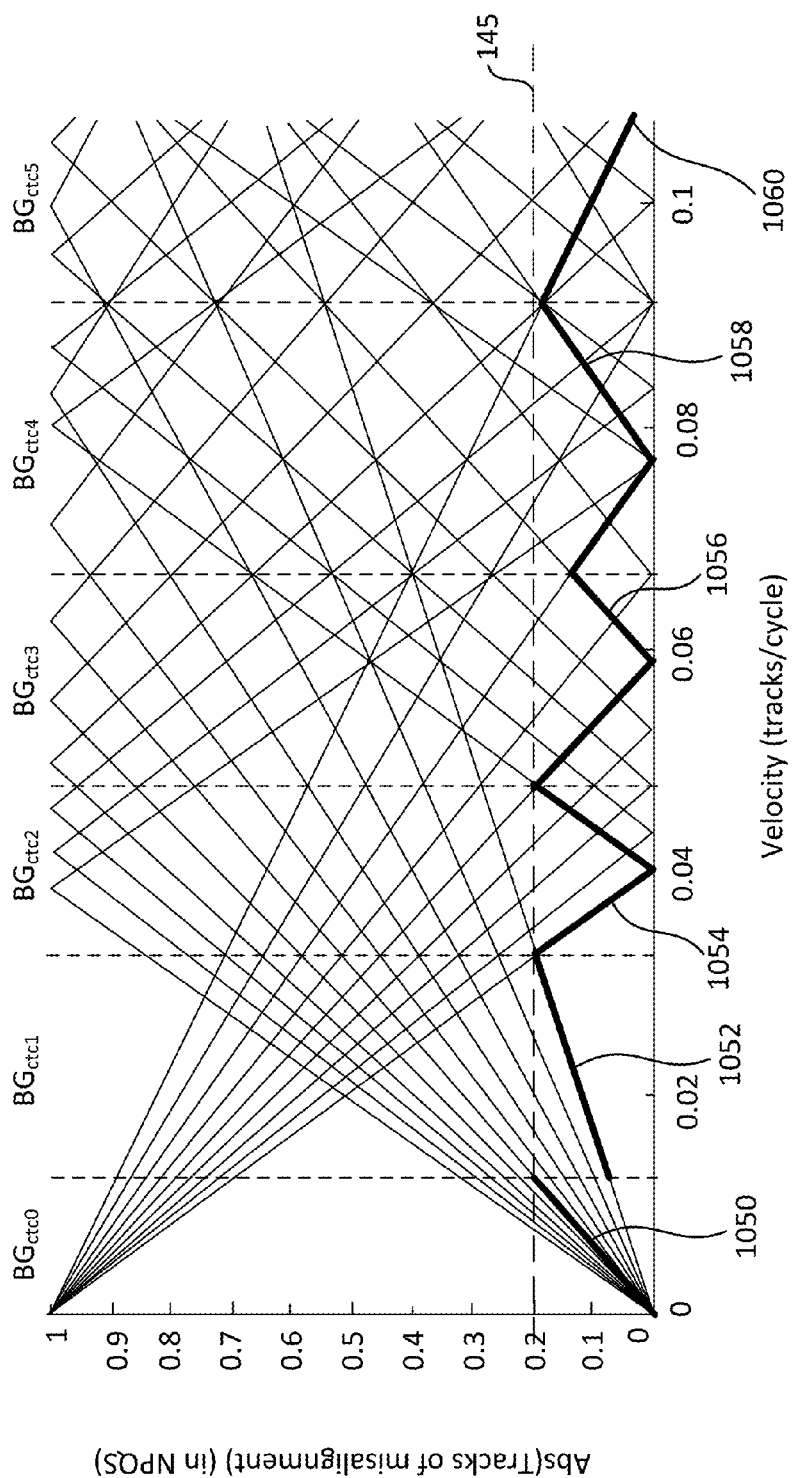
FIG. 10E shows FIGS. 10B and 10D superimposed, in accordance with certain embodiments of the present disclosure.

The results of FIGS. 10B and 10D are superimposed in FIG. 10E. Selection of $BG_{ctc}$ for different seek velocities to mitigate the PES misalignment starts by selecting a maximum desired PES misalignment. FIG. 10E shows a maximum desired PES misalignment of 0.2 of a track pitch. Then, segments are selected from the superimposed results of FIGS. 10B and 10D. Then, segment 1052 is chosen because it minimizes the PES misalignment. When segment 1052 meets line 1070, segment 1054 is chosen. This is repeated for segments 1056-1060.

Note that all the shown segments except 1050 are contiguous. Segment 1050 is chosen because it corresponds to the $BG_{ctc}$ that is used for track following. Specifically, segment 1050 corresponds to the use of the maximal $BG_{width}$, which is helpful for reducing signal noise and minimizing any impact to track following performance. This $BG_{width}$ is used until the velocity-induced phase error reaches a maximum tolerance.

Segments can be selected that provide for a $BG_{ctc}$ to be used for the greatest velocity subrange possible. The predetermined maximum PES misalignment can be adjusted, with the segments selected accordingly. Furthermore, more or less segments can be selected depending on system considerations for efficiency, performance or accuracy, or system capabilities to handle the more or less segments. The $BG_{ctc}$ used to generate segments 1050-1060 are used for the velocity subranges defined by segments 1050-1060. As shown, $BG_{ctc0}$-$BG_{ctc5}$ correspond to segments 1050-1060, respectively. The system is then programmed with a table of schedules that associate seek velocity subranges with corresponding $BG_{ctc}$.

Figure 12:
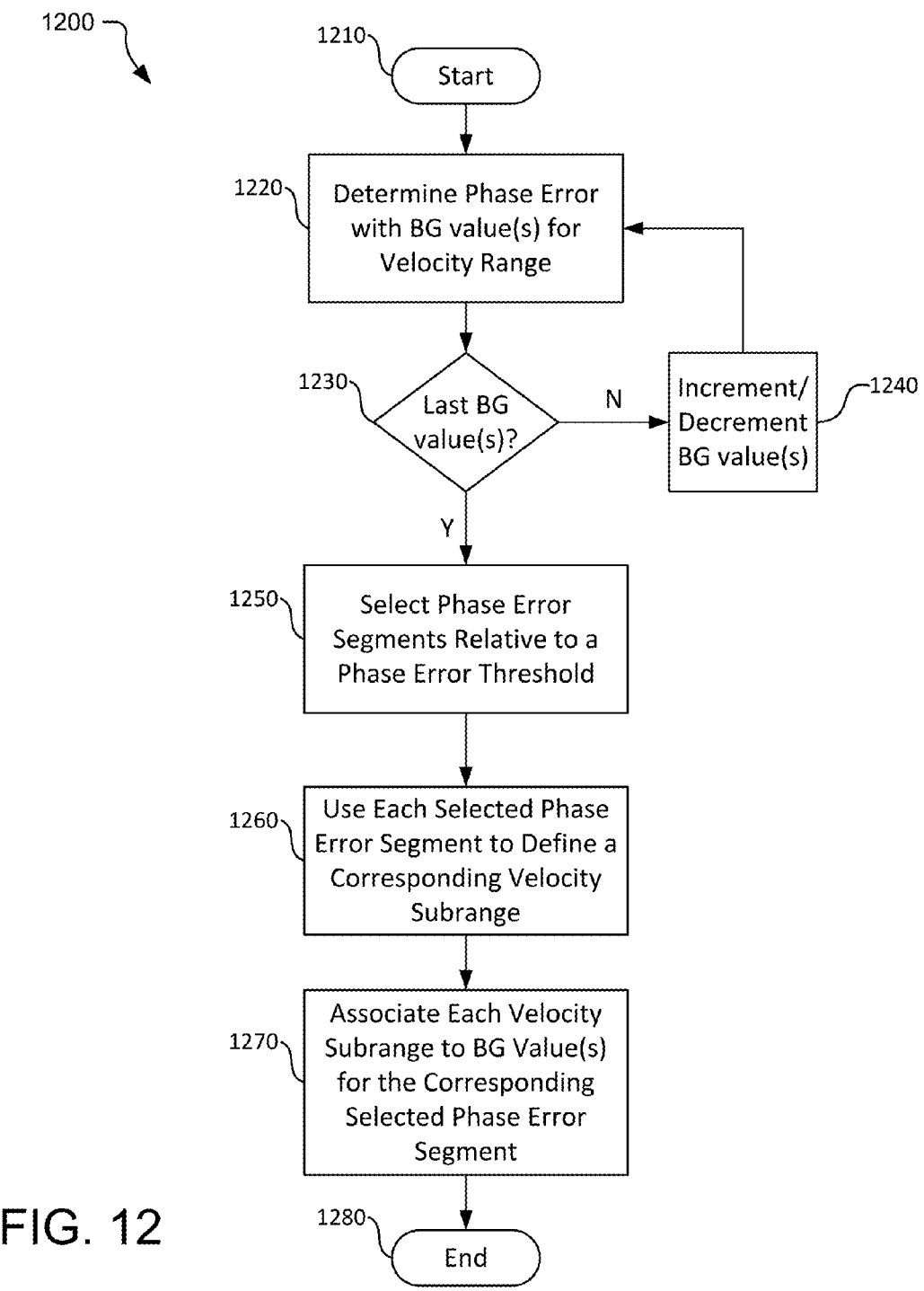
FIG. 12 is a flowchart of a method optimizing PES detection gate signals, in accordance with certain embodiments of the present disclosure.

A method for creating a table of velocity schedules for $BG_{ctc}$ is shown in FIG. 12. Method 1200 starts at step 1210, then proceeds to step 1220 that determines at least one of the BG values (e.g., $BG_{delay}$, $BG_{gap}$, $BG_{width}$ and $BG_{ctc}$) for a velocity range such as shown in FIGS. 10B and 10D. Then at step 1230 a determination is made whether the last BG value(s) have been used to generate the data as shown in FIGS. 10B and 10D. If no, the method proceeds to step 1240 where the BG value(s) are either incremented or decremented. Then the method returns to step 1220.

If all the last BG value(s) have been used to generate the data, then the method proceeds to step 1250 where phase error segments are selected relative to the phase error threshold, such as shown in FIG. 10E. Proceeding to step 1260, each selected phase error segment is used to define a corresponding velocity subrange. Then at step 1270 each velocity subrange is associated with $BG_{ctc}$ values that were used to generate the selected phase error segment used to define that velocity subrange. Method 1200 ends at step 1280.

FIG. 13 illustrates a block diagram that can be used to implement methods for reducing PES error, particularly those described above. Position information is read from a medium 1300 by reader 1310. A preamp 1320 receives and amplifies the read position information. A channel 1330 receives the amplified position information and determines its values. Those values are then input to a servo controller 1340 that uses those values to determine the PES. This can be done in the functional block PES Gen shown in servo controller 1340. That function can be in addition to other functions of the servo controller, such as generate commands for the VCM to control movement of the actuator assembly. Servo controller 1340 provides control signals to preamplifier 1320, particularly the position error signal detection gate signals generated by the BG values described above. Each block shown can be implemented in hardware alone or hardware controlled by firmware, where the controlled hardware can be custom or standard circuitry (e.g. transistors, integrated circuits, a processor or controller, system-on-ship (SOC), or any combination thereof, etc.)

In operation, block diagram of FIG. 13 can perform a method shown in FIG. 14. Note that this method is not limited to the FIG. 13 implementation. Method 1400 starts at step 1410, the proceeds to step 1420 to estimate the velocity of the transducer. The velocity can be the result of a seek, and it can be a velocity resulting from something like track eccentricity or virtual tracking. With the velocity estimated at a certain position, the method proceeds to step 1430 where the PES detection gate signal timing is modified to compensate for the estimated velocity. Such modification can be modulating the PES detection gate signal timing by changing the BG value(s). A compensated PES can be generated as a result of the modulation. Method 1400 ends at step 1440.

The position error can be further reduced since the residual phase error is completely deterministic given head velocity and PES detection gate signal timing, and the variation of induced position error varies cross-track. In particular, since the transducer is traversing the servo pattern, it is generally not at the same radial position for the duration of the servo pattern. Therefore, it can be useful to choose a single point in the pattern where the position will be determined. In an embodiment, the transducer position is accurately determined at the time when it is exactly between the PES1 and PES2 bursts. This is shown by point 880 in FIG. 8. When the seek velocity causes a misalignment error 850, PES1 can be considered as being misplaced by +$error_{850}/2$ and the PES2 burst as being misplaced by -$error_{850}/2$. Therefore, a simple compensation can be applied that linearly varies between +$error_{850}/2$ and -$error_{850}/2$.

Figure 15:
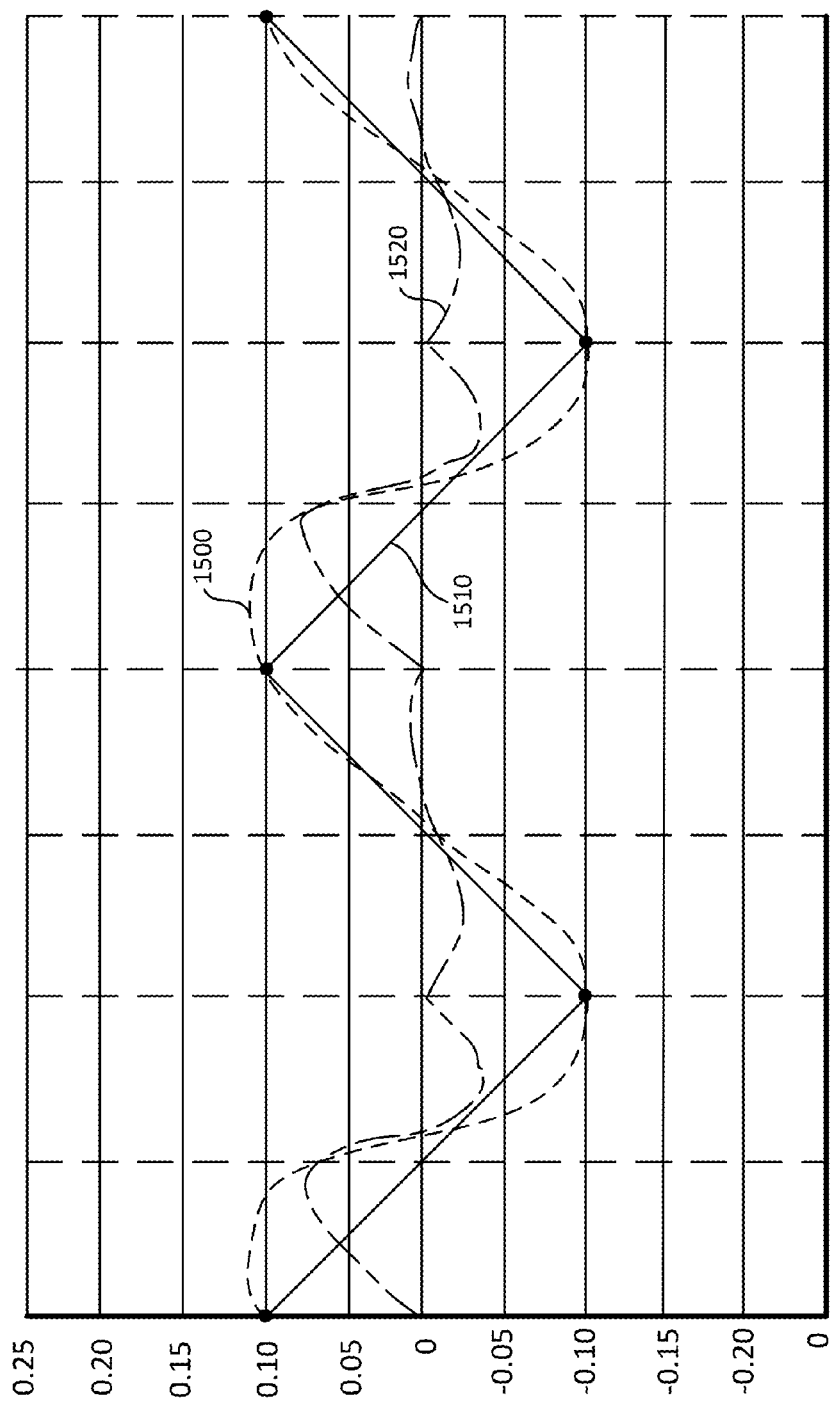
FIG. 15 shows PES compensation, in accordance with certain embodiments of the present disclosure.

This linear compensation is shown in FIG. 15. Here, the residual phase error is shown as line 1500. The points where the residual phase error intersects with a predetermined value (shown as 0.10 and -0.10 of the track pitch) are connected by lines 1510. This linearizes the remaining phase error. Residual phase error 1500 is combined with linearized residual phase error 1510 to generate compensated residual phase error 1520. This compensation can implemented, for example, in the servo controller 1340, particularly PES Gen, shown in FIG. 13, In this manner velocity-induced PES error can be further reduced.

However, the compensation for residual phase error does not have to be linear. To illustrate, an alternative method can exactly model the curvature of the residual phase error and cancels it all (i.e. where line 1510 exactly lines up with line 1500). Or selected points from line 1500 can be used for a curve-fit or interpolation function, Regardless, methods of compensating for residual phase error provide for approximations of the residual phase error.

Figure 16:
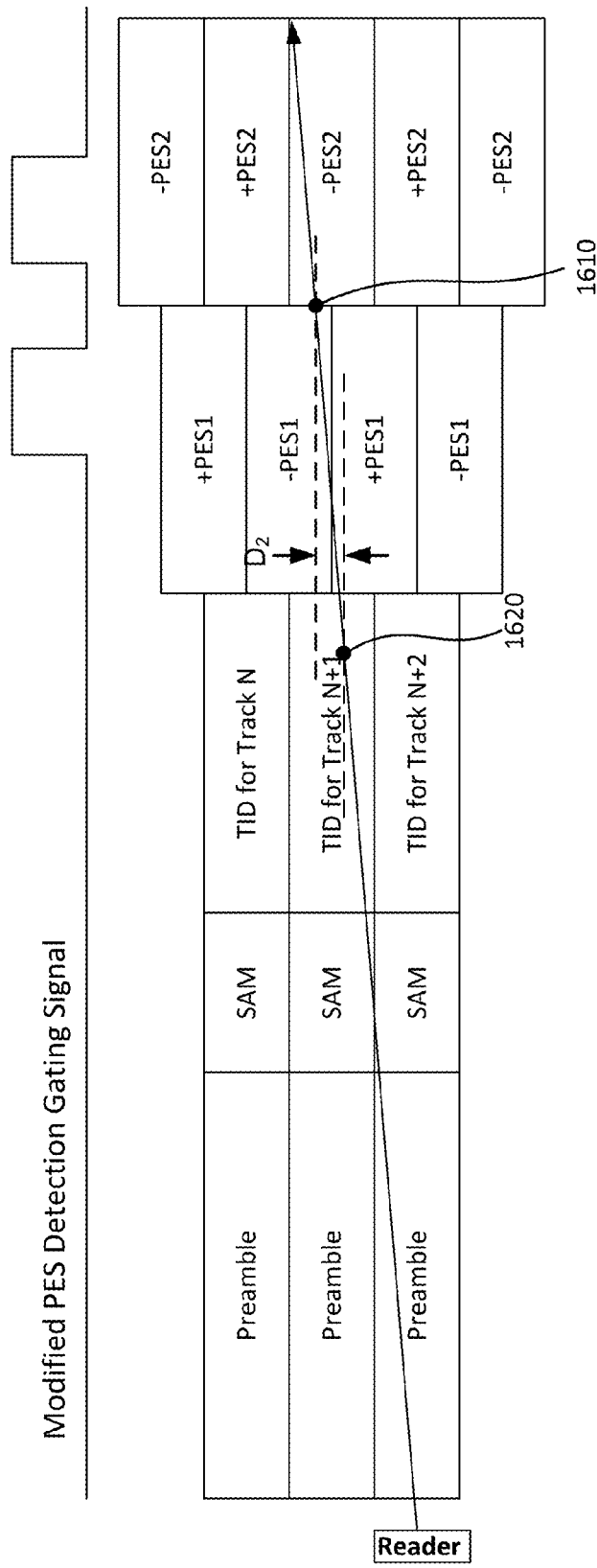
FIG. 16 shows a servo pattern related to TID compensation, in accordance with certain embodiments of the present disclosure.

Further compensation will be explained relative to the track ID (TID). Each TID is a unique identifier written into the servo pattern to identify the location of the pattern on the disc (often with a resolution of 1 track). TIDs are written in gray code in a way that that the TIDs for adjacent tracks can differ only by one bit, which means that when the reader is straddling a border between two TIDs, only one bit is "uncertain." When track following, the fine position (derived from the PES bursts) can be used to resolve the uncertain bit. However, when the reader is traveling at a nonzero velocity across the track, the radial positions of the reader as it traverses the TID are misaligned with respect to the point of position reference (between the PES bursts as shown by 1610 in FIG. 16, for example). Fortunately, this misalignment is completely deterministic given transducer velocity and knowledge of the servo pattern timing.

TID misalignment compensation uses knowledge of the fine position and the velocity to estimate the fine position of the head at a specific time or times during the reading of the TID. To illustrate with reference to FIG. 16, distance $D_2$ is subtracted from the fine position at position reference 1610 to estimate the fine position at a point 1620 in the TID field where the uncertain bit is expected to be. This estimated fine position is then used to resolve the uncertainty and a complete position is formed. $D_2$ is added to this position to project it back to the reference point, thereby generating the final position which will be used for position control.

Figure 11:
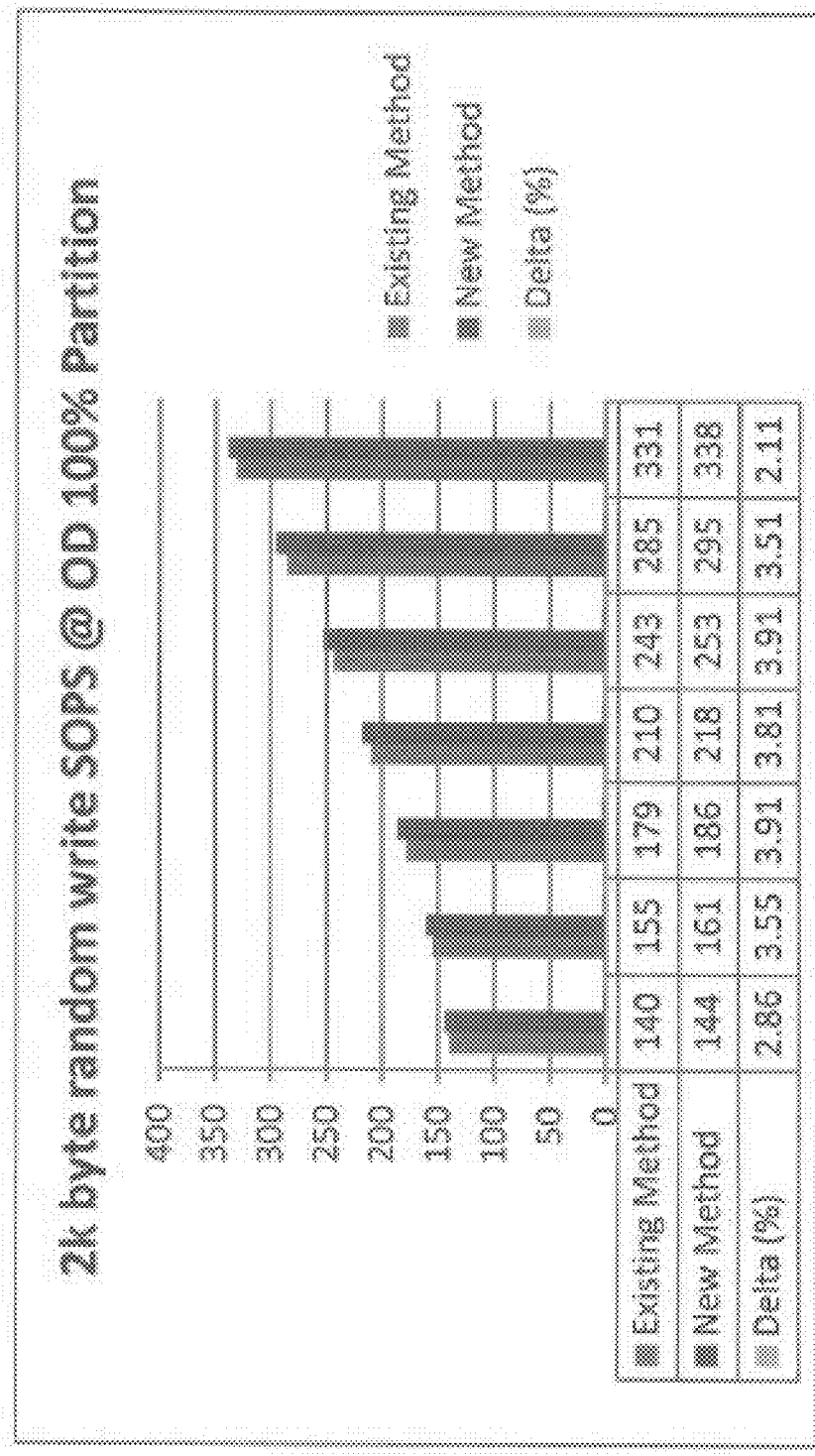
FIG. 11 is a graph of performance comparison for modifying PES detection gate signals, in accordance with certain embodiments of the present disclosure.

As a seek is performed, the system uses the detected seek velocity to obtain the corresponding $BG_{ctc}$ of the PES detection gate signals. Then at least one of $BG_{delay}$, $BG_{gap}$, $BG_{width}$ and $BG_{ctc}$ are modified. By defining several contiguous velocity sub ranges and assigning to each a unique $BG_{ctc}$, it is possible to ensure that PES1 and PES2 are never phase aligned. In an example test system, the phase error was kept below $\pi/5$ radians at all velocities. This is a significant improvement as shown in FIG. 11, which is a result of using methods including those described above. Dynamically modifying the PES detection gate signals leads to improvements on the order of 2%-4% in random performance aspects of the disc drive. During this testing, the acoustic emission levels of the drive were also audibly lower.

As mentioned previously, for virtual disc formats, there is little to no velocity crossing the track throughout the servo sector when the servo system is track following. However, as the TPI increases, this may not be the case. Methods and apparatus described above can be used for such track following as well as seeking.

Micro actuators are used for seeks as well as the carriage. Methods and apparatus described above can allow much higher bandwidth during seeks with the micro actuators. A result will be more consistent and repeatable seek lengths.

Figure 17:
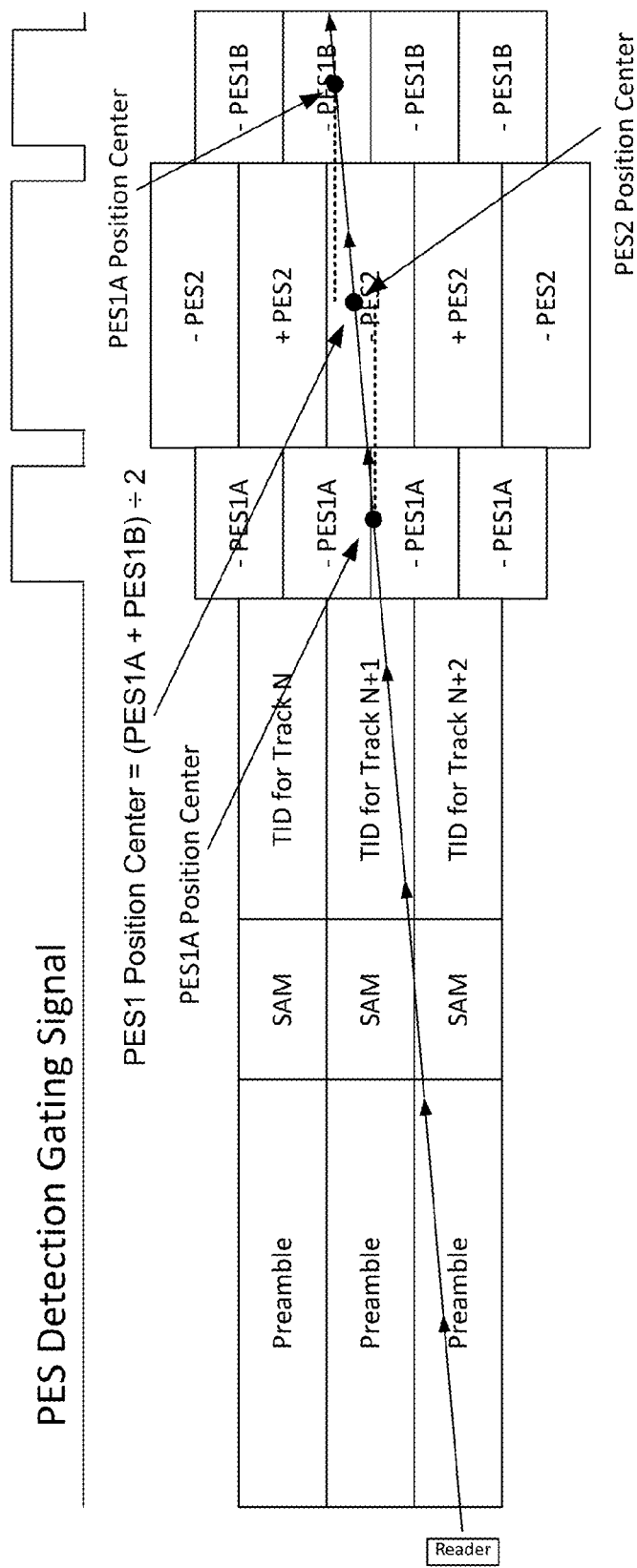
FIG. 17 shows another servo pattern for PES compensation, in accordance with certain embodiments of the present disclosure.

Another aspect is the servo pattern can be modified to achieve a common position center. FIG. 17 shows a diagram of the modification. By splitting the PES1 field around the PES2 field as shown, the common position center is maintained through all reasonable seeking velocities. However, the servo pattern must be lengthened slightly to account for an extra splice between the bursts. Furthermore, this servo pattern uses three splices whereas the other servo patterns described above use one splice. Both of those cause a loss of format efficiency. If the loss of efficiency can be tolerated in the system, then this is also a viable option for improved PES accuracy at higher velocities. Also, applying the above described modulation of $BG_{ctc}$ to this servo pattern would reduce the phase error.

The methods and apparatus described above can be advantageously used in magnetic, magneto-optical, and optical storage devices. Other systems that use an actuated assembly for relative movement that use position information while in motion.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device, such as hardware components storing instructions that when executed cause a processor to perform the methods. Instructions for performing the methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to receive read position information; and
   a controller circuit adapted to modulate a position error signal detection gate signal responsive to a track crossing velocity, the controller circuit adapted to compensate for a residual phase error of a phase error after the modulating.

2. The apparatus of claim 1 wherein at least one of a width and gap associated with the position error signal detection gate signal is modulated.

3. The apparatus of claim 1 wherein the track crossing velocity is included in a velocity range that includes velocity subranges, wherein the modulating is responsive to the velocity subranges.

4. The apparatus of claim 1 wherein the compensating includes approximating a residual phase error.

5. The apparatus of claim 1 further comprising the controller circuit adapted to compensate for track identification misalignment.

6. The apparatus of claim 1 wherein the track crossing velocity is estimated relative to tracks of a storage medium.

7. The apparatus of claim 6 wherein each of the tracks includes servo position information including coarse and fine position information.

8. The apparatus of claim 1 further comprising:
   a data channel coupled to the controller circuit;
   a preamplifier coupled to the data channel, the preamplifier adapted to amplify the position information;
   the data channel adapted to receive the position information from the preamplifier, determine values thereof, and provide the values to the controller circuit;
   the controller circuit adapted to:
      determine the position error signal detection gate signal based on the values; and
      provide the position error signal detection gate signal to the preamplifier.

9. A method comprising:
   determining a plurality of phase error segments having respective cross-track velocity sub-ranges for which use of respective burst gap center to center values result in phase errors less than or equal to a phase error threshold;

estimating a cross-track velocity at samples;

selecting a phase error segment of the plurality of phase error segments having a respective cross-track velocity sub-range that includes the estimated cross-track velocity; and modifying a position error signal detection gate signal to compensate for a phase error including setting the burst gap center to center value of the position error signal detection gate signal to the burst gap center to center value corresponding to the selected phase error segment.

10. The method of claim 9 wherein a width and a gap associated with the position error signal detection gate signal are modified.

11. The method of claim 9 further comprising compensating for a residual phase error of the phase error after the modifying.

12. The method of claim 11 wherein the compensating includes approximating a residual phase error.

13. The method of claim 11 further comprising compensating for track identification misalignment.

14. The method of claim 9 wherein the velocity is estimated relative to tracks of a storage medium.

15. The method of claim 14 wherein each of the tracks includes servo position information including coarse and fine position information, the modified position error signal detection gate signal used to read the fine position information.

16. The method of claim 9 wherein the position error signal detection gate signal controls a preamplifier.

17. A device comprising:

a circuit configured to:

estimate a seek velocity across tracks of a storage medium;

modulate at least one of a burst gate gap, width, delay and center-to-center value based on the seek velocity; and compensate for the residual phase error of the phase error after the modulating.

18. The device of claim 17 further comprising:

a preamplifier responsive to the modulating; and the circuit further configured to perform the modulating based on phase errors due to seek velocity-induced position signal phase error.

19. The device of claim 17 further comprising the compensating includes approximating a residual phase error.

20. The device of claim 17 further comprising the circuit further configured to compensate for track identification misalignment.

* * * * *